(12) United States Patent
Wu et al.

(10) Patent No.: US 12,173,746 B2
(45) Date of Patent: Dec. 24, 2024

(54) FLOATING FASTENER WITH SHOCK-ABSORBING STRUCTURE

(71) Applicant: HANWIT PRECISION INDUSTRIES LTD., New Taipei (TW)

(72) Inventors: Ming-De Wu, New Taipei (TW); Ching-Kai Chang, New Taipei (TW); Ying-Chih Tseng, New Taipei (TW)

(73) Assignee: HANWIT PRECISION INDUSTRIES LTD., New Taipei (TW)

( * ) Notice: Subject to any disclaimer, the term of this patent is extended or adjusted under 35 U.S.C. 154(b) by 159 days.

(21) Appl. No.: 18/158,079

(22) Filed: Jan. 23, 2023

(65) Prior Publication Data

US 2023/0340978 A1 Oct. 26, 2023

(30) Foreign Application Priority Data

Apr. 21, 2022 (TW) .................................. 111115292

(51) Int. Cl.
*F16B 21/18* (2006.01)
*F16B 5/02* (2006.01)

(52) U.S. Cl.
CPC .......... *F16B 5/0266* (2013.01); *F16B 5/0208* (2013.01)

(58) Field of Classification Search
CPC ..... F16B 5/0258; F16B 5/0241; F16B 5/0208
USPC ................................................ 411/107, 353
See application file for complete search history.

(56) References Cited

U.S. PATENT DOCUMENTS

| 7,771,149 | B2* | 8/2010 | Bauer | F16B 41/002 411/533 |
| 8,875,681 | B2* | 11/2014 | Kannan | F16F 1/41 123/456 |
| 9,790,974 | B2* | 10/2017 | Holt | F16B 21/02 |
| 9,915,236 | B1* | 3/2018 | Bircann | F02M 59/48 |
| 11,592,050 | B2* | 2/2023 | Clark | F16B 21/16 |
| 12,055,175 | B2* | 8/2024 | Wu | F16B 5/0208 |
| 2006/0202101 | A1* | 9/2006 | Dickson | F16F 1/3735 248/638 |
| 2008/0226418 | A1* | 9/2008 | Parisi | B60R 11/00 411/337 |
| 2013/0259596 | A1* | 10/2013 | Nambara | F16B 39/00 411/166 |
| 2014/0161562 | A1* | 6/2014 | Dechant | F16B 41/002 411/511 |
| 2018/0094667 | A1* | 4/2018 | Clark | F16B 5/0258 |

(Continued)

*Primary Examiner* — Gary W Estremsky
(74) *Attorney, Agent, or Firm* — MUNCY, GEISSLER, OLDS & LOWE, P.C.

(57) ABSTRACT

A floating fastener with shock-absorbing structure includes a base having a cylindrical portion and a bottom plate and an abutment ring and an inner ring formed in the cylindrical portion, a fixing element having a head, a shank and locking portion, a flexible liner having a top-sided positioning embedding portion placed in a first fixing hole of a preset first plate, a positioning tube having a tube body and a protruding ring portion, and a buffer pad having a ring groove positioned on the protruding ring portion of the positioning tube. The assembly structure of the positioning tube and the buffer pad is placed outside the cylindrical portion of the base from top to bottom through the perforation of the positioning tube to form a positioning, and the bottom side of the buffer pad is held against the upper surface of the preset first plate.

9 Claims, 9 Drawing Sheets

(56) References Cited

U.S. PATENT DOCUMENTS

2018/0245614 A1* 8/2018 Kato ...................... F16F 15/06
2019/0154073 A1* 5/2019 Figge ................... F16B 5/0258

* cited by examiner

FLOATING FASTENER WITH SHOCK-ABSORBING STRUCTURE

This application claims the priority benefit of Taiwan patent application number 111115292, filed on Apr. 21, 2022.

BACKGROUND OF THE INVENTION

1. Field of the Invention

The present invention relates to fasteners more particularly, to a floating fastener with shock-absorbing structure, which is provided with a buffer pad and a flexible liner, and the two are flexibly held against the upper and lower surfaces of the preset first plate to absorb and buffer the stress transmitted to the preset first plate when the floating fastener vibrates.

2. Description of the Related Art

Please refer to FIGS. 8 and 9, which are a side sectional exploded view and a side sectional view of a conventional floating fastener. It is embedded in the bolt head A11 of the cap A with the screw A1, and the elastic member B is attached to the screw A1, and the cap A and the elastic member B are fixed on the connecting seat C. Use the inner hook A2 under the cap A to be fastened to the flange C1 at the upper end of the connecting seat C, so that the cap A and the connecting seat C are buckled together with the elastic member B to form the floating fastener D. Then insert the buckle C2 at the lower end of the connecting seat C of the floating fastener D into the positioning plate E. And use hand tools to lock the screw A1 in the cap A down into the fixing plate E1 to achieve the purpose of locking the positioning plate E and the fixing plate E1. However, the connecting seat C of the floating fastener D is fixed on the positioning plate E, and then locked to the fixing plate E1 by the screw A1 of the cap A. When the positioning plate E and the fixing plate E1 are affected by external force and produce shaking, vibration or impact force, etc., the positioning plate E and the fixing plate E1 are subjected to the external force to produce shaking, yaw or displacement, etc. That is to say, it is easy to cause the electronic components on the positioning plate E and the fixing plate E1 to be affected by shaking, resulting in poor signal.

Based on the various shortcomings of the above-mentioned conventional floating fastener, it needs to be developed and improved by those engaged in this industry.

SUMMARY OF THE INVENTION

In view of the above-mentioned problems and deficiencies, the inventor collected relevant information, and after various evaluations and considerations, he designed the invention of this floating fastener with shock-absorbing structure.

It is therefore a main object of the present invention to provide a floating fastener with shock-absorbing structure, which comprises a base comprising a cylindrical portion, an accommodating space formed through the cylindrical portion, a protruding abutment ring and an inner ring provided on an inner wall of the cylindrical portion, and a bottom plate extending outwards from a bottom side of the cylindrical portion; a fixing element comprising a head, a shank extending downwards from the head and passing through the accommodating space of the base, a locking portion extending downwards from the shank, and a stop portion located on a top side of the locking portion around the shank for stopping against a bottom side of the inner ring; a flexible liner attached with a bottom surface thereof to a top surface of the bottom plate, the flexible liner comprising a perforation placed outside the cylindrical portion of the base and a positioning embedding portion protruding upwards from a top side thereof around the perforation of the flexible liner and placed in a first fixing hole of a preset first plate; a positioning tube comprising a tube body formed with a perforation through the inside and a protruding ring portion expanding outward from a bottom side of the tube body; and a buffer pad comprising a perforation inside and a ring groove set in an inner wall thereof and positioned on the protruding ring portion of the positioning tube. The assembly structure of the positioning tube and the buffer pad is placed outside the cylindrical portion of the base through the perforation of the positioning tube from top to bottom to form a positioning. The buffer pad and the flexible liner are flexibly supported on opposing upper and lower surfaces of the preset first plate respectively, so as to absorb and buffer the stress transmitted to the preset first plate when the floating fastener vibrates.

It is another object of the present invention to provide a floating fastener with shock-absorbing structure, wherein the accommodating space of the base is approximately in three stages with different apertures. The aperture from the topmost edge of the cylindrical portion to the abutment ring is the largest. The aperture from the bottom of the base to the inner ring is next. The aperture between the abutment ring and the inner ring is the smallest.

It is still another object of the present invention to provide a floating fastener with shock-absorbing structure, wherein the cylindrical portion of the base has a flange formed on a top side thereof and expanding downwards, and a bevel angle formed on a top side of the flange. The positioning tube further comprises a tapered wall surface formed on an inner wall of the tube body and the protruding ring portion. The thickness of the tapered wall surface gradually shrinking from top to bottom, so that when the assembly structure of the positioning tube and the buffer pad is placed outside the cylindrical portion of the base through the perforation of the positioning tube from top to bottom, the tapered wall surface slides down along the bevel angle to let a bottom side of the buffer pad abut against the upper surface of the preset first plate, so that a supporting portion on a top side of the tube body of the positioning tube pushes up against a bottom side of the flange to form a positioning.

It is still another object of the present invention to provide a floating fastener with shock-absorbing structure, wherein the bottom plate of the base has an abutment surface attached to an upper surface of a preset second plate. The preset second plate has a second fixing hole for locking and fixing the locking portion of the fixing element. The second fixing hole has an inner wall thereof provided with an internal thread. The locking portion of the fixing element is provided with an external thread for engagement with the internal thread of the second fixing hole of the preset second plate.

It is still another object of the present invention to provide a floating fastener with shock-absorbing structure, wherein an elastic member is sleeved on the shank and set between a bottom side of the head of the fixing element and the abutment ring of the base.

DETAILED DESCRIPTION OF THE PREFERRED EMBODIMENT

Figure 1:
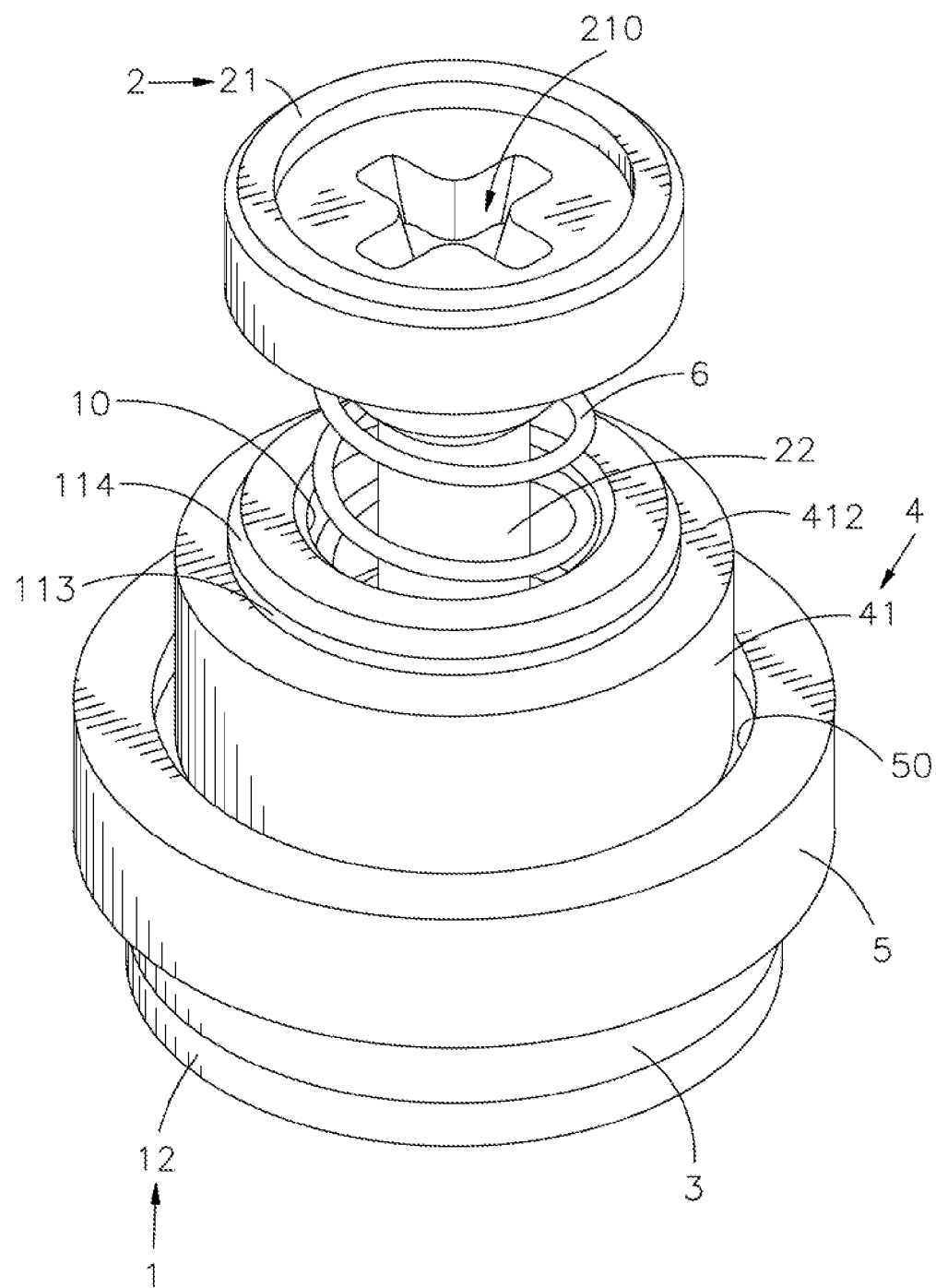
FIG. 1 is an oblique top elevational view of a floating fastener in accordance with the present invention.
Figure 2:
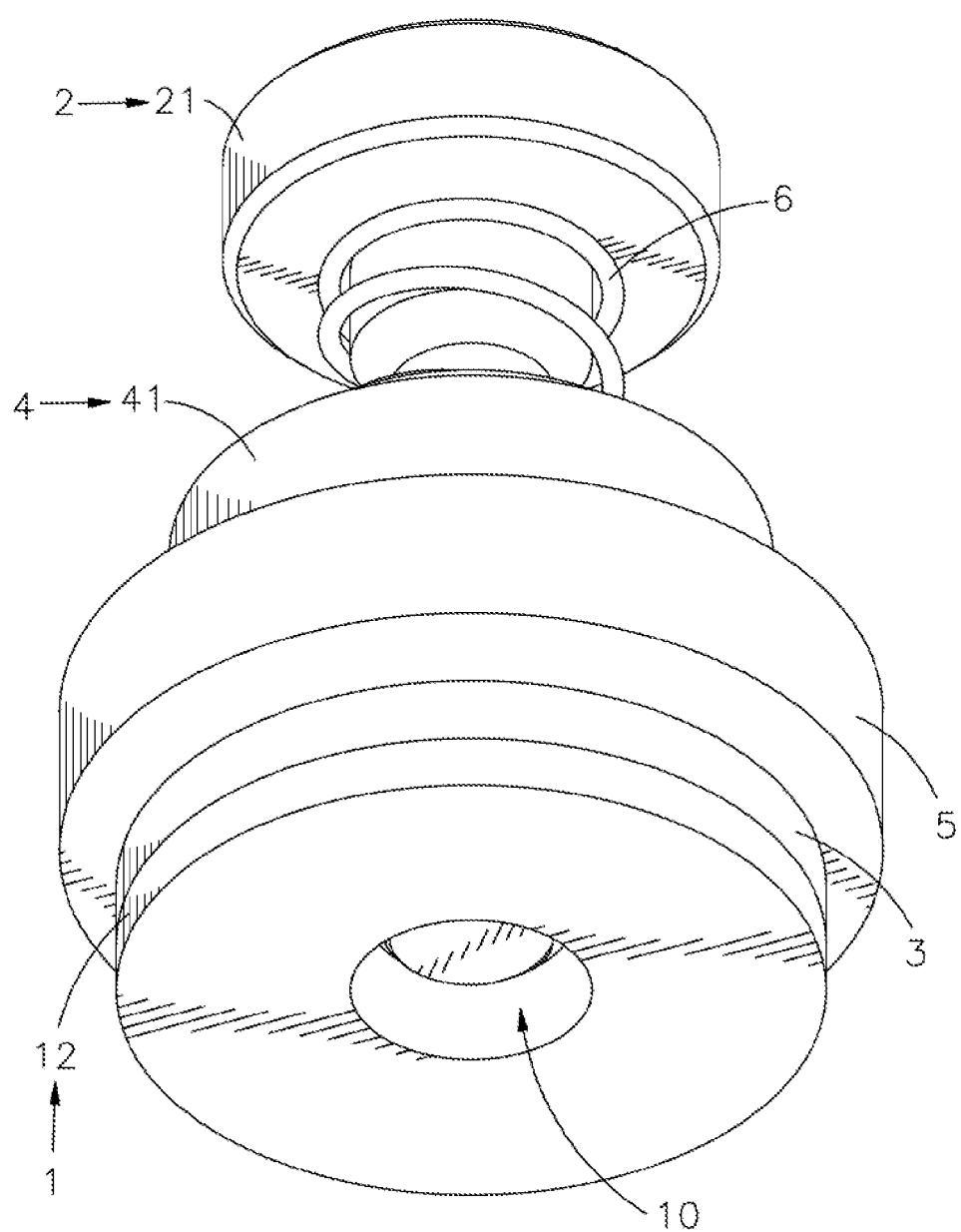
FIG. 2 corresponds to FIG. 1 when viewed from another angle.
Figure 3:
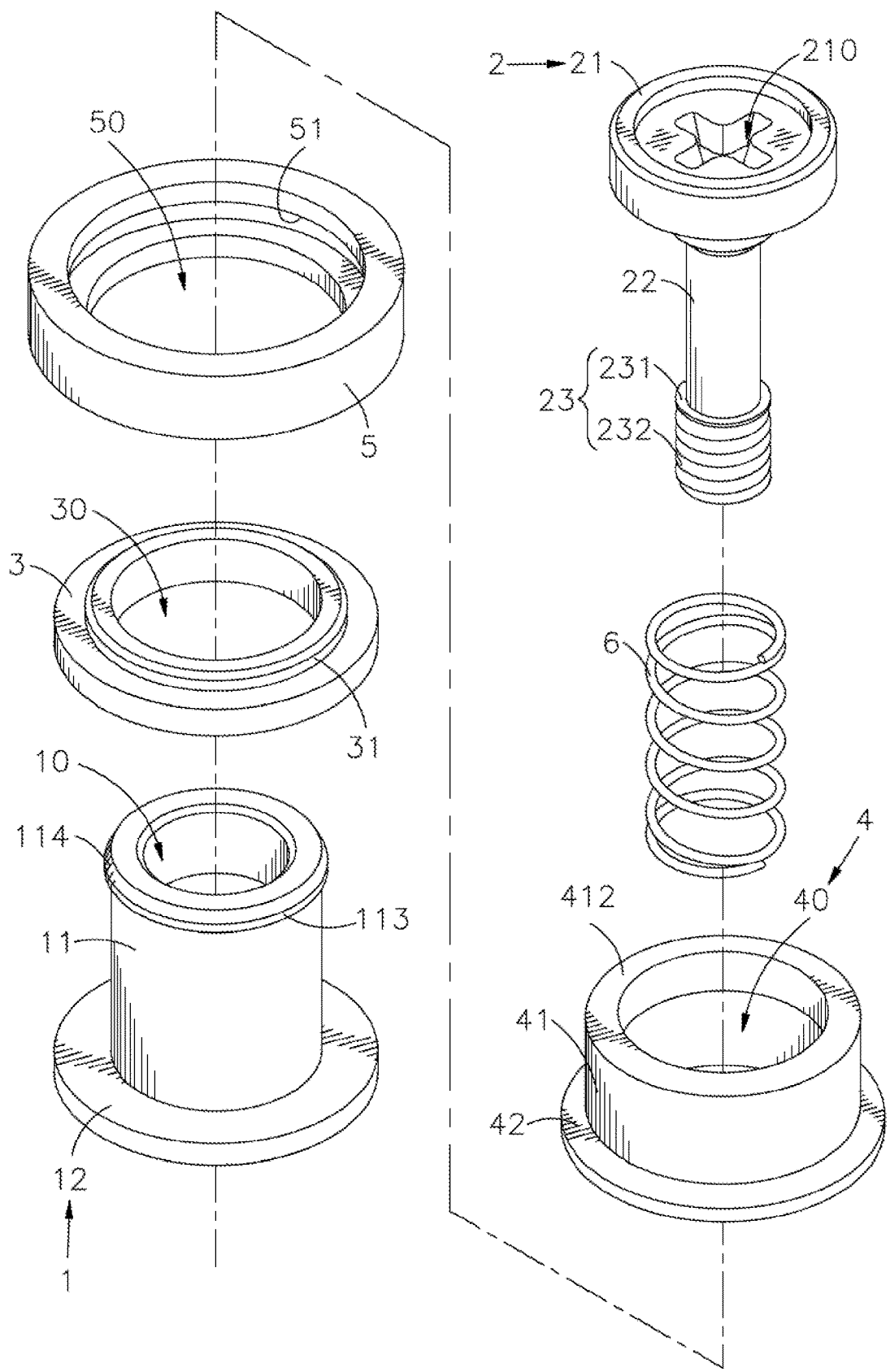
FIG. 3 is an exploded view of the floating fastener in accordance with the present invention.
Figure 4:
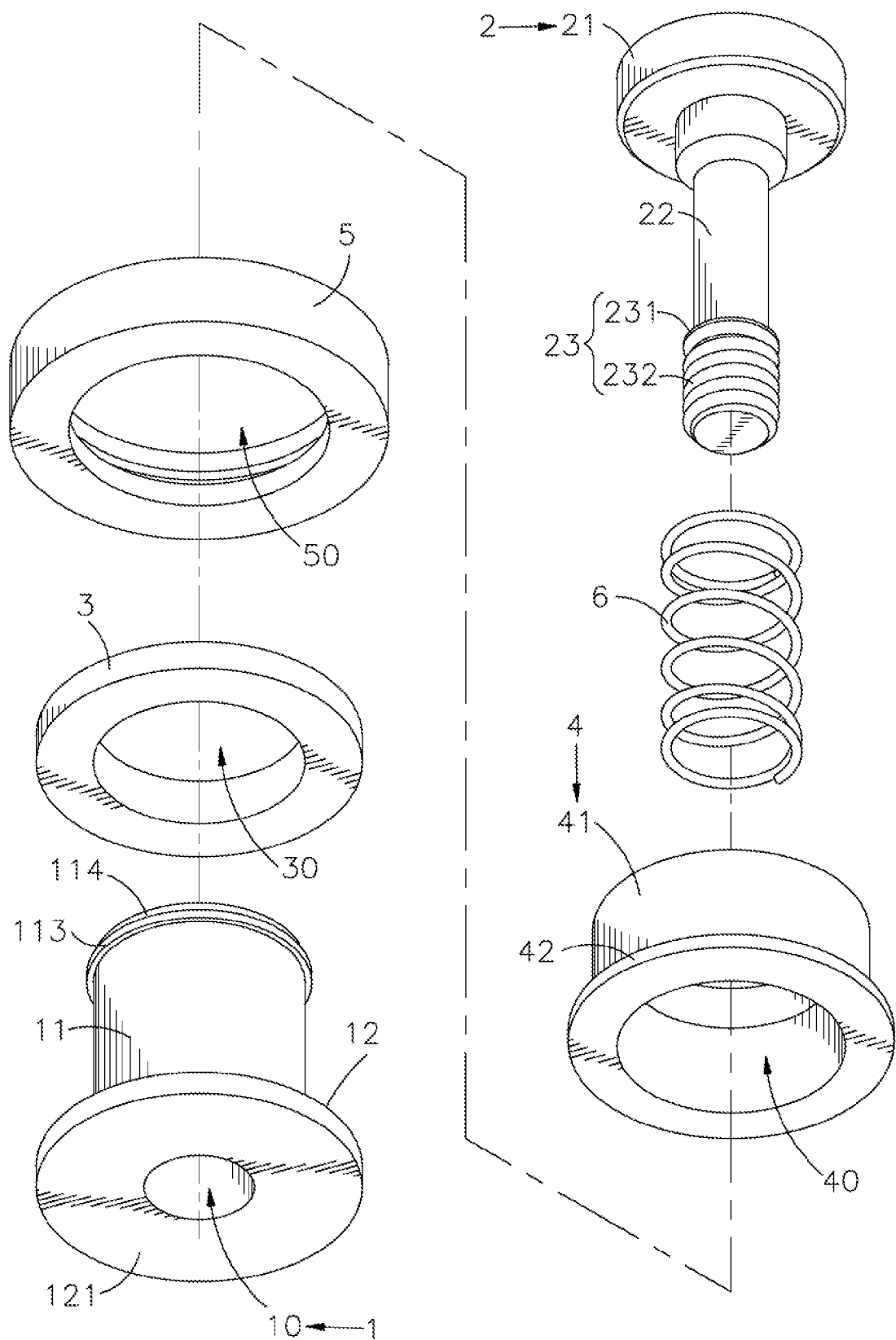
FIG. 4 corresponds to FIG. 3 when viewed from another angle.

In order to achieve the above objects and effect, the technical means used in the present invention and its structure, implementation method, etc., the preferred embodiment of the present invention is hereby described in detail and its features and functions are as follows, so as to be fully understood.

Please refer to FIGS. 1 to 7. It can be clearly seen from the drawings that the floating fastener with shock-absorbing structure of the present invention mainly comprises: a base 1, a fixing element 2, a flexible liner 3, a positioning tube 4 and a buffer pad 5, its main components and features are detailed as follows:

The base 1 comprises a cylindrical portion 11 through which an accommodating space 10 is formed, a protruding abutment ring 111 and an inner ring 112 provided on the inner wall of the cylindrical portion 11, and a bottom plate 12 extending outwards from the bottom side of the cylindrical portion 11.

The fixing element 2 comprises a head 21, a shank 22 extending downwards from the head 21 and passing through the accommodating space 10 of the base 1, a locking portion 23 extending downwards from the shank 22, and a stop portion 231 located on the top side of the locking portion 23 around the shank 22 for stopping against the bottom side of the inner ring 112.

The flexible liner 3 comprises a perforation 30 that can be placed outside the cylindrical portion 11 of the base 1, and a positioning embedding portion 31 protruding upwards from the top side thereof around the perforation 30 and placed in a first fixing hole 70 of a preset first plate 7. The bottom surface of the flexible liner 3 is attached to the top surface of the bottom plate 12.

The positioning tube 4 comprises a tube body 41 formed with a perforation 40 through the inside, and a protruding ring portion 42 expanding outward from the bottom side of the tube body 41.

The buffer pad 5 comprises a perforation 50 inside, and a ring groove 51 set in the inner wall thereof and positioned on the protruding ring portion 42 of the positioning tube 4. The assembly structure of the positioning tube 4 and the buffer pad 5 is placed outside the cylindrical portion 11 of the base 1 through the perforation 40 of the positioning tube 4 from top to bottom to form a positioning, and the bottom side of the buffer pad 5 is against the upper surface of the preset first plate 7. The buffer pad 5 and the flexible liner 3 are flexibly supported on the upper and lower surfaces of the preset first plate 7 respectively, so as to absorb and buffer the stress transmitted to the preset first plate 7 when the floating fastener vibrates.

The accommodating space 10 of the above-mentioned base 1 is approximately in three stages with different apertures. The aperture from the top of the cylindrical portion 11 to the abutment ring 111 is the largest, the aperture from the bottom of the base 1 to the inner ring 112 is next, and the aperture between the abutment ring 111 and the inner ring 112 is the smallest.

The top side of the cylindrical portion 11 of the above-mentioned base 1 has a flange 113 formed by expanding downwards, and a bevel angle 114 is formed on the top side of the flange 113. The inner wall of the tube body 41 and the protruding ring portion 42 of the positioning tube 4 forms a tapered wall surface 411 whose thickness gradually shrinks from top to bottom. When the assembly structure of the positioning tube 4 and the buffer pad 5 is placed outside the cylindrical portion 11 of the base 1 through the perforation 40 of the positioning tube 4 from top to bottom, the tapered wall surface 411 slides down along the bevel angle 114 to let the bottom side of the buffer pad 5 abut against the upper surface of the preset first plate 7, so that a supporting portion 412 on the top side of the tube body 41 of the positioning tube 4 pushes up against the bottom side of the flange 113 to form a stable positioning.

The bottom side of the bottom plate 12 of the above-mentioned base 1 has an abutment surface 121 attached to an upper surface of a preset second plate 8. The preset second plate 8 has a second fixing hole 80 for locking and fixing the locking portion 23 of the fixing element 2. The inner wall of the second fixing hole 80 has an internal thread for the locking portion 23 having an external thread 232 to be screwed and fixed.

Between the bottom side of the head 21 of the fixing element 2 and the abutment ring 111 of the base 1, there is an elastic member 6 sleeved on the shank 22. The top surface of the head 21 of the fixing element 2 is provided with an actuating groove 210 for locking or unlocking a preset hand tool, and the actuating groove 210 refers to a groove in the shape of a straight line, a cross, a hexagon or a plum blossom shape.

The above-mentioned flexible liner 3 and the buffer pad 5 are all made of silicone, plastic or rubber material to form an integral structure.

The aperture of the perforation 40 of the positioning tube 4 is smaller than the aperture of the perforation 50 of the buffer pad 5.

When the floating fastener of the present invention is to be assembled, the floating fastener can be divided into two parts. The first part is to place the elastic member 6 around the outside of the shank 22 of the fixing element 2, and insert the locking portion 23 into the accommodating space 10 in the cylindrical portion 11 of the base 1 from top to bottom. When the locking portion 23 slides through the inner ring 112, the stop portion 231 on the top side of the locking portion 23 is held against the bottom side of the inner ring 112, so that the fixing element 2 cannot escape from the base 1. Then, place the perforation 30 of the flexible liner 3 outside the cylindrical portion 11 of the base 1 to attach the bottom surface of the flexible liner 3 onto the top surface of the bottom plate 12, thus completing the assembly of the first part. The second part of the assembly is relatively simple, just need to penetrate the protruding ring portion 42 of the positioning tube 4 into the ring groove 51 of the buffer pad 5 to form the positioning structure of the two, and complete the second part of the assembly.

Figure 5:
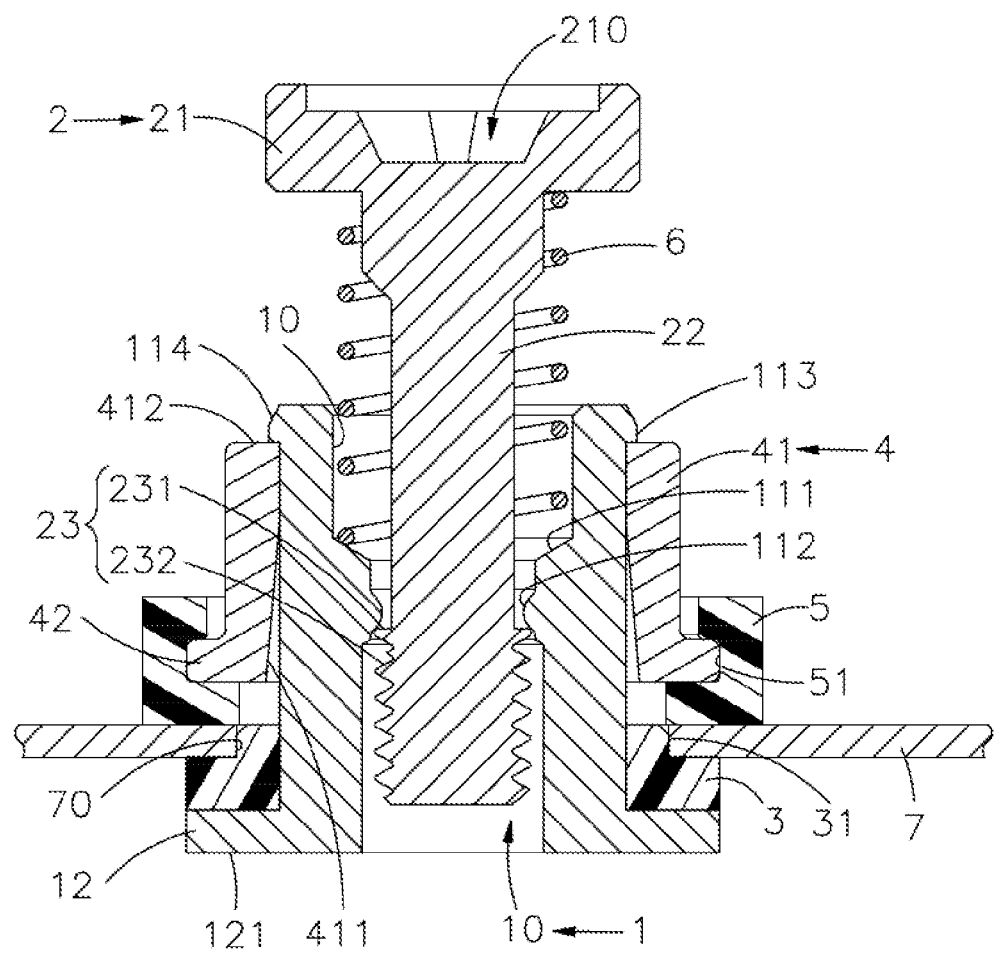
FIG. 5 is a side sectional view of the floating fastener of the present invention and the first plate after fixing.
Figure 6:
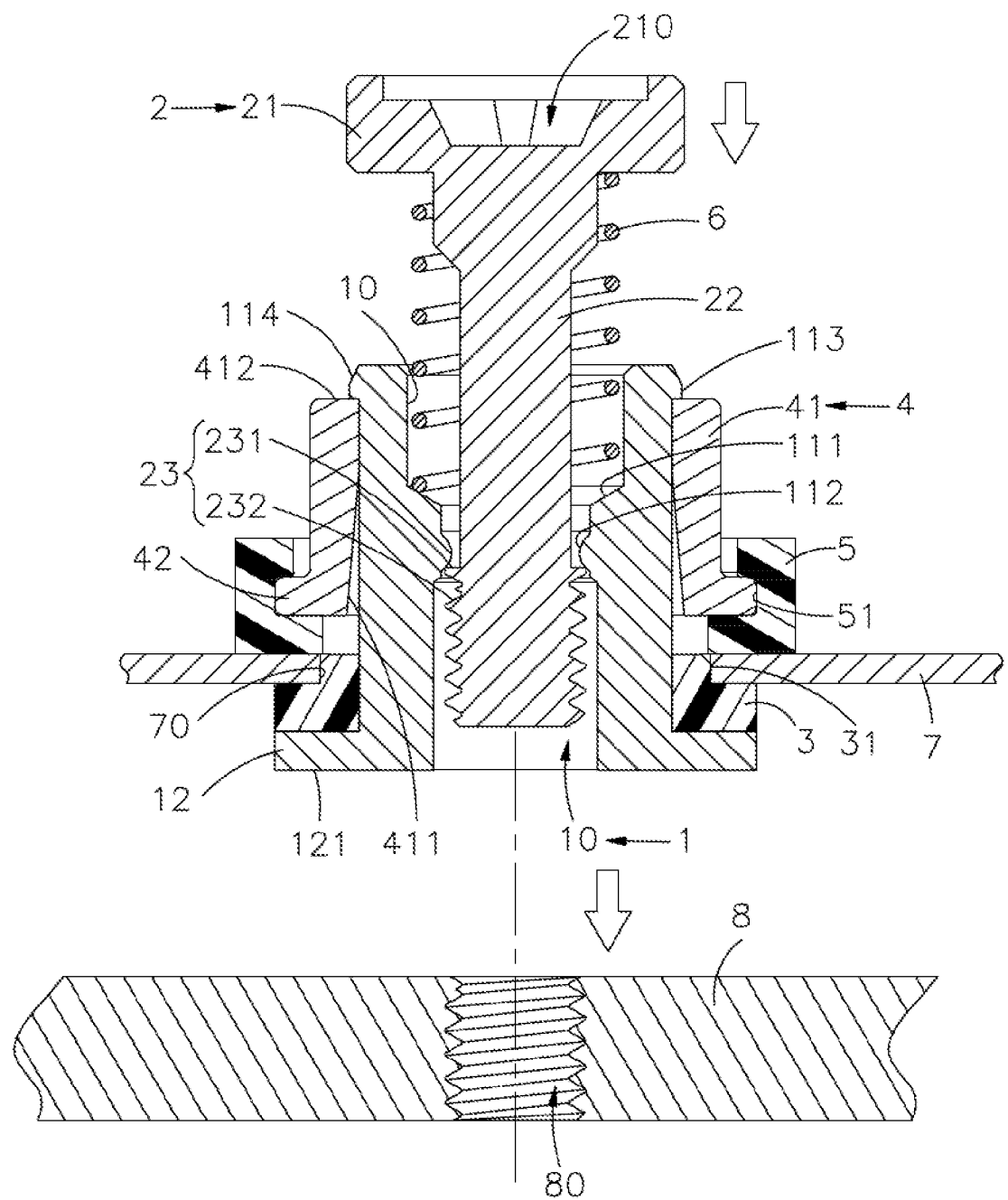
FIG. 6 is a side sectional view of the floating fastener and the first plate of the present invention after being fixed and then the second plate before being fixed.
Figure 7:
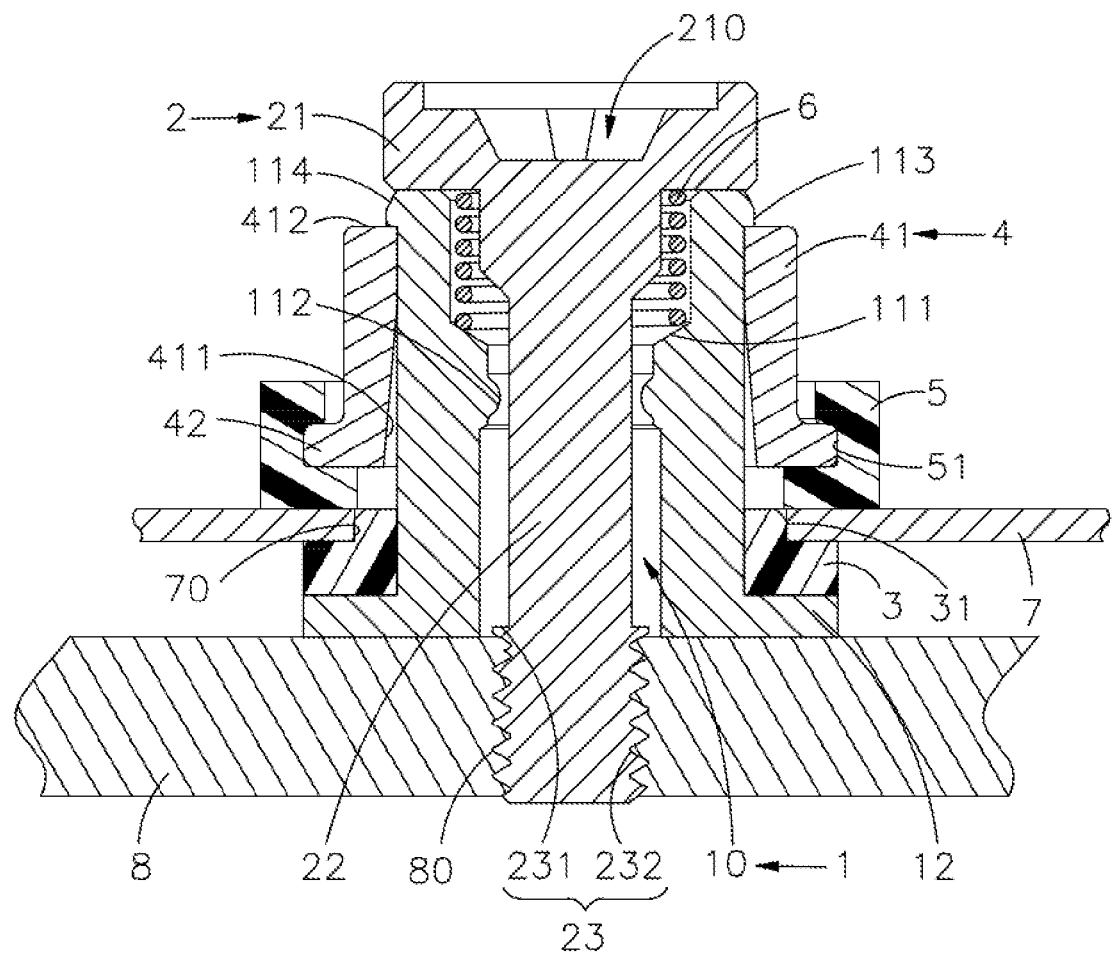
FIG. 7 is a side sectional view of the floating fastener and the first plate of the present invention after being fixed and then the second plate is fixed.
Figure 8:
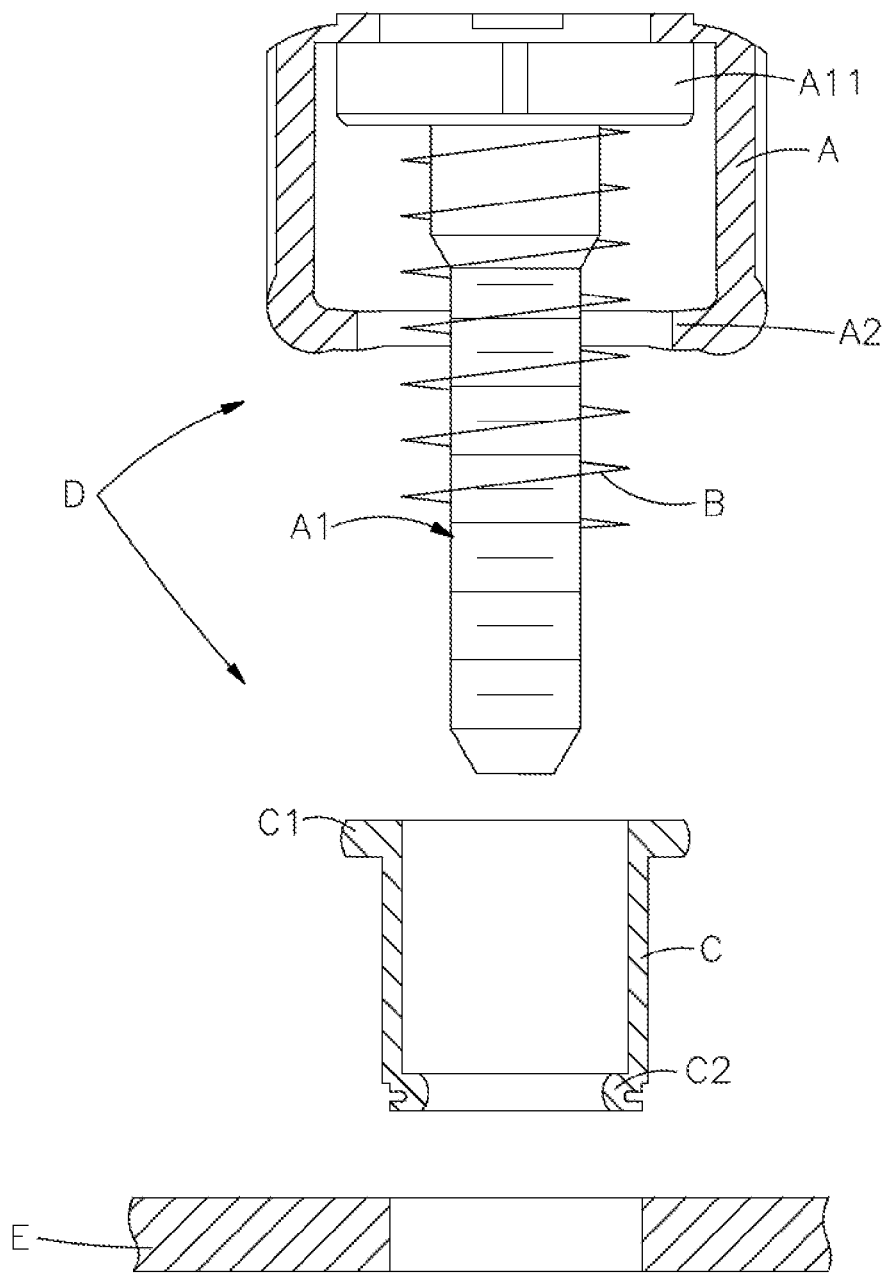
FIG. 8 is a side sectional exploded view of a conventional floating fastener.
Figure 9:
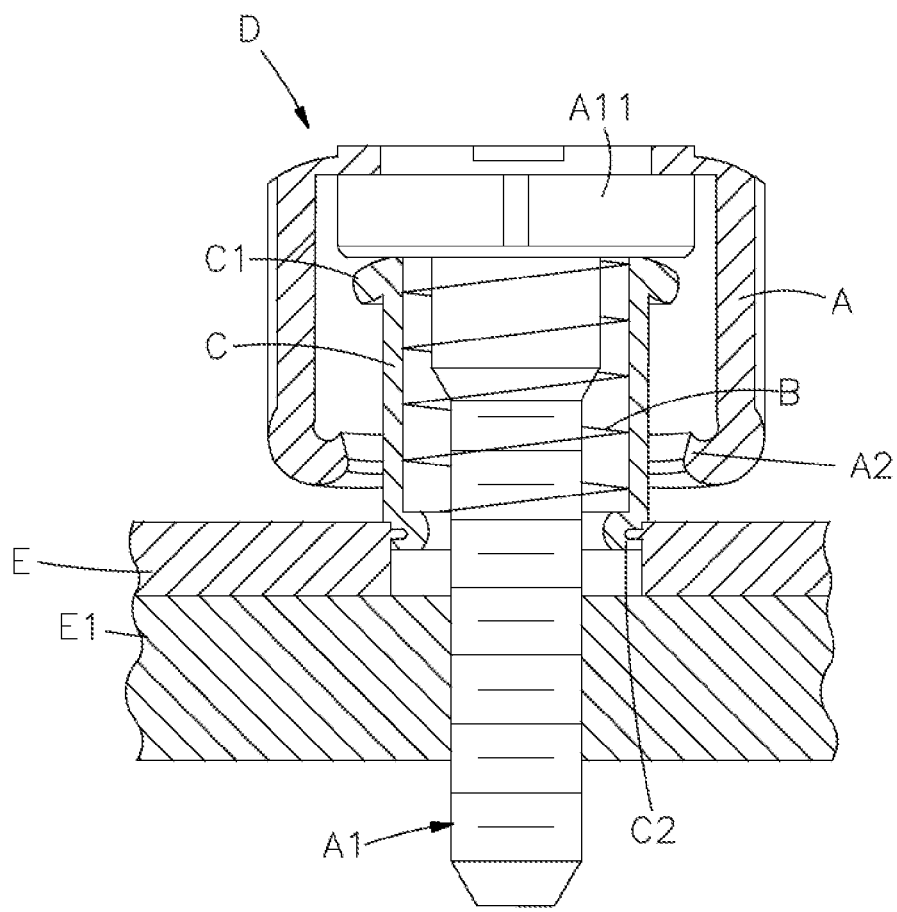
FIG. 9 is a side sectional view of the conventional floating fastener.

Please refer to FIGS. 5 to 7, when the floating fastener of the present invention is actually used, first align the head 21 of the fixing element 2 of the first part with the first fixing hole 70 of the preset first plate 7, and do a piercing from bottom to top. The flexible liner 3 located outside the base 1 uses its positioning embedding portion 31 to pass upwards in the first fixing hole 70 to form a positioning. While the second part is placed outside the cylindrical portion 11 of base 1 from top to bottom through the perforation 40 of the positioning tube 4, the tapered wall surface 411 inside the positioning tube 4 slides down along the bevel angle 114 of the cylindrical portion 11, so that the bottom side of the buffer pad 5 bears against the upper surface of the preset first plate 7, and the supporting portion 412 on the top side of the tube body 41 of the positioning tube 4 supports upward against the bottom side of the flange 113 to form stable positioning. At this point, the fixing of the floating fastener and preset first plate 7 is completed (see in FIG. 5). The next step is to complete the assembly of the floating fastener on the preset second plate 8. Attach the abutment surface 121 on the bottom side of the bottom plate 12 of the base 1 to the upper surface of the preset second plate 8. The preset second plate 8 has a second fixing hole 80 for the locking portion 23 of the fixing element 2 to be locked and fixed, and the inner wall of the second fixing hole 80 has an internal thread for screw fixation with the external thread 232 of the locking portion 23 of the fixing element 2. At this point, the fixing of the floating fastener and the preset second plate 8 is completed.

From the above-mentioned disclosure of FIGS. 1 to 7, it can be understood that the present invention is a floating fastener with shock-absorbing structure, which comprises a base comprising a cylindrical portion, a bottom plate and a protruding abutment ring and an inner ring on the inner wall of the cylindrical portion; a fixing element comprising a head, a shank and a locking portion; a flexible liner comprising a positioning embedding portion protruding upwards from the top side thereof and passed through a first fixing hole of a preset first plate to form positioning; a positioning tube comprising a tube body and a protruding ring portion; and a buffer pad having an inner wall thereof concavely provided with a ring groove positioned at the protruding ring portion of the positioning tube. The assembly structure of the positioning tube and the buffer pad is placed outside the cylindrical portion of the base from top to bottom through the perforation of the positioning tube to form a positioning. The bottom side of the buffer pad is against the upper surface of the preset first plate. The buffer pad and the flexible liner are flexibly held against the upper and lower surfaces of the preset first plate respectively to absorb and buffer the stress transmitted to the preset first plate when the floating fastener vibrates. The present invention is applied in the field of shock-absorbing structures of floating fasteners, and has excellent practicability, so a patent application is filed to seek the protection of the patent right.

The above is only a preferred embodiment of the present invention, and does not limit the patent scope of the present invention. Therefore, all simple modifications and equivalent structural changes made by using the contents of the description and drawings of the present invention should be included in the patent scope of the present invention in the same way.

What the invention claimed is:

1. A floating fastener with shock-absorbing structure, comprising:
    a base comprising a cylindrical portion, an accommodating space formed through said cylindrical portion, a protruding abutment ring and an inner ring provided on an inner wall of said cylindrical portion, and a bottom plate extending outwards from a bottom side of said cylindrical portion;
    a fixing element comprising a head, a shank extending downwards from said head and passing through said accommodating space of said base, a locking portion extending downwards from said shank, and a stop portion located on a top side of said locking portion around said shank for stopping against a bottom side of said inner ring;
    a flexible liner attached with a bottom surface thereof to a top surface of said bottom plate, said flexible liner comprising a perforation placed outside said cylindrical portion of said base and a positioning embedding portion protruding upwards from a top side thereof around said perforation of said flexible liner and placed in a first fixing hole of a preset first plate;
    a positioning tube comprising a tube body formed with a perforation through the inside and a protruding ring portion expanding outward from a bottom side of said tube body; and
    a buffer pad comprising a perforation inside and a ring groove set in an inner wall thereof and positioned on said protruding ring portion of said positioning tube;
    wherein the assembly structure of said positioning tube and said buffer pad is placed outside said cylindrical portion of said base through said perforation of said positioning tube from top to bottom to form a positioning; said buffer pad and said flexible liner are flexibly supported on opposing upper and lower surfaces of said preset first plate respectively, so as to absorb and buffer the stress transmitted to said preset first plate when the floating fastener vibrates.

2. The floating fastener with shock-absorbing structure as claimed in claim 1, wherein said accommodating space of said base is approximately in three stages with different apertures, the aperture from the topmost edge of said cylindrical portion to said abutment ring is the largest, the aperture from the bottom of said base to said inner ring is next, and the aperture between said abutment ring and said inner ring is the smallest.

3. The floating fastener with shock-absorbing structure as claimed in claim 1, wherein said cylindrical portion of said base has a flange formed on a top side thereof and expanding downwards, and a bevel angle formed on a top side of said flange; said positioning tube further comprises a tapered wall surface formed on an inner wall of said tube body and said protruding ring portion, the thickness of said tapered wall surface gradually shrinking from top to bottom, so that when the assembly structure of said positioning tube and said buffer pad is placed outside said cylindrical portion of said base through said perforation of said positioning tube from top to bottom, said tapered wall surface slides down along said bevel angle to let a bottom side of said buffer pad abut against the upper surface of said preset first plate, so that a supporting portion on a top side of said tube body of said positioning tube pushes up against a bottom side of said flange to form a positioning.

4. The floating fastener with shock-absorbing structure as claimed in claim 1, wherein said bottom plate of said base has an abutment surface attached to an upper surface of a preset second plate, said preset second plate having a second fixing hole for locking and fixing said locking portion of said fixing element, said second fixing hole having an inner wall thereof provided with an internal thread; said locking portion of said fixing element is provided with an external thread for engagement with said internal thread of said second fixing hole of said preset second plate.

5. The floating fastener with shock-absorbing structure as claimed in claim 1, further comprising an elastic member sleeved on said shank and set between a bottom side of said head of said fixing element and said abutment ring of said base.

6. The floating fastener with shock-absorbing structure as claimed in claim 1, wherein said head of said fixing element has a top surface thereof provided with an actuating groove for locking or unlocking a preset hand tool, and said actuating groove refers to a groove in the shape of a straight line, a cross, a hexagon or a plum blossom shape.

7. The floating fastener with shock-absorbing structure as claimed in claim 1, wherein the aperture of said perforation of said positioning tube is smaller than the aperture of said perforation of said buffer pad.

8. The floating fastener with shock-absorbing structure as claimed in claim 1, wherein said flexible liner is a one-piece structure selectively made of silicone, plastic or rubber.

9. The floating fastener with shock-absorbing structure as claimed in claim 1, wherein said buffer pad is a one-piece structure selectively made of silicone, plastic or rubber.

\* \* \* \* \*